United States Patent [19]

Lindell

[11] 3,956,953
[45] May 18, 1976

[54] DEVICE IN ROD CROSS CUTTING AUTOMATIC MACHINES

[75] Inventor: Lennart Jan-Åke Lindell, Skovde, Sweden

[73] Assignee: Hjo Mekaniska Verkstad, Hjo, Sweden

[22] Filed: Sept. 16, 1974

[21] Appl. No.: 506,172

[30] Foreign Application Priority Data

Sept. 14, 1973 Sweden............................ 73125593

[52] U.S. Cl.................................. 83/188; 83/206; 83/262; 83/277; 83/461; 269/22
[51] Int. Cl.²............................................ B26D 7/02
[58] Field of Search............. 83/188, 206, 209, 210, 83/211, 277, 282, 389, 375, 390, 456, 461, 580, 639, 382, 384, 262, 444, 453; 269/22; 226/39, 195

[56] References Cited
UNITED STATES PATENTS

| | | | |
|---|---|---|---|
| 2,404,901 | 7/1946 | Cibs.................................. | 83/188 X |
| 2,412,930 | 12/1946 | Walklet............................. | 83/188 X |
| 2,673,227 | 3/1954 | Hubert............................... | 269/22 X |
| 3,204,504 | 9/1965 | Bradlee.............................. | 83/382 X |
| 3,323,788 | 6/1967 | Roudier.............................. | 269/22 |
| 3,486,406 | 12/1969 | Woodward.......................... | 83/390 X |
| 3,567,088 | 3/1971 | Andersen........................... | 83/188 X |
| 3,590,674 | 7/1971 | Maeda et al....................... | 83/456 X |
| 3,596,550 | 8/1971 | Tominaga........................... | 83/390 |
| 3,843,109 | 10/1974 | Bogosh.............................. | 269/22 |

*Primary Examiner*—J. M. Meister
*Assistant Examiner*—Fred A. Silverberg

[57] ABSTRACT

A machine is provided for cutting rod-like material traversely to its longitudinal axis. The machine comprises means for feeding the material, means for cutting a portion off the rod-like material; brake means, which are located in the vicinity of the cutting means, for guiding and braking the rod-like material in the vicinity of the cutting means; wherein the brake means comprises a housing which includes two radially movable jaws and a flexible hose surrounding the jaws for frictionally engaging the material as it is being fed by the feeding means to guide the material in the vicinity of the cutting means.

1 Claim, 2 Drawing Figures

DEVICE IN ROD CROSS CUTTING AUTOMATIC MACHINES

BACKGROUND OF THE INVENTION

The present invention relates to automatic machines for cross cutting rod material and the like. The present machine is, for purposes of feeding the rod intended for cross-cutting, generally provided with two alternatively working gripper tongs of which the gripper tongs situated nearest the cross cutting tool are rigid and the other ones reversibly movable in the longitudinal direction of the rod.

In known automatic cross-cutting machines of this kind it has been necessary to discard comparatively long pieces of rods as it has not been possible to cut the rod after its back end has reached the front terminal position of the movable gripper tongs. These cross-cutting machines are generally provided with a cross-cutting tool consisting of two slides resting against each other, transversely relative to the rod. The slides are provided with through-holes supporting the rod material. The rear slide when looking in the feeding direction is standing still and forms a guide for the rod material, while the other slide is displaceable along the first slide with the aid of suitable power devices between a feeding position in which the two recesses are situated in line with each other i.e. the rod material is freely feedable and a position in which the recesses are laterally displaced relative to each other. The cross-cutting occurs by shearing. In cross-cutting automatic machines of this kind great demands are made upon the means holding the rod material during the cross-cutting operation.

The main object of the present invention is to provide a device making possible cross-cutting nearly the entire rod intended for cutting.

BRIEF SUMMARY OF THE INVENTION

This object is attained with a device according to the present invention, in which in the vicinity of the cross-cutting toll, a brake is provided for gripping the rod, said brake being arranged, so as, to allow the rod to pass overcoming the frictional resistance caused by said brake while at the same time guiding the rod at the cross-cutting tool by exerting pressure.

BRIEF DESCRIPTION OF THE DRAWING

The invention is illustrated, by way of example, in the accompanying drawing, in which.

DETAILED DESCRIPTION OF A PREFERRED EMBODIMENT

Figure 1:
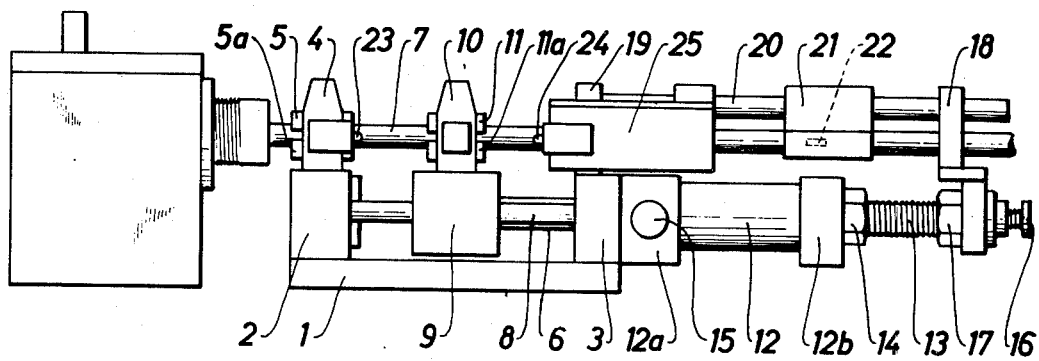
FIG. 1 is a schematic side view of a part of an automatic cross-cutting machine provided with the device according to the invention.

In FIG. 1, a horizontal supporting plate 1 is attached to a machine frame (not shown) and supports a gable piece 2 and 3 respectively at each of its ends. The front gable piece 2 supports preferably pneumatically controllable gripper tongs 4 provided with an upper and a lower jaw 5 and 5a respectively which are movable between a release position and a gripping position in which it holds the rod 7 being cut. Between the two gable pieces 2 and 3 there extend two guides 8 horizontally spaced from each other on which a runner 9 is displaceably mounted in bearings (not shown). The runner 9 supports back gripper tongs 10 which as the first mentioned gripper tongs are provided with an upper and a lower jaw 11 and 11a respectively, which are arranged to grip and feed the rod 7, in a manner described further below.

One end piece 12a of a feeding cylinder 12 is attached to the gable piece 3 while its piston rod 6 positioned between the two guides 8 has its front end attached to the runner 9. The feeding cylinder 12 is provided with a movable inside back gable whose position is adjustable by screwing a threaded spindle 13 in or out. Spindle 13 is locked against the back end piece 12b of the hydraulic cylinder by a locking nut 14. Numerals 15 and 16 respectively designate a front and a back damping valve which are arranged to lower the speed of the piston, when approaching the respective end position. The spindle 13 supports at its end a retainer 18 attached with a locking nut 17. The retainer together with a corresponding retainer 19 attached to the gable piece 3 supports a shaft 20, parallel with rod 7 and positioned a distance therefrom. Numeral 21 designates a sensing device which is adjustable along shaft 20 and provided with a sensor 22 which in the position of the rod 7 shown in the drawing, rests against the rod. Furthermore, a sensor 23 is arranged at the back of front gripper tongs 4 and a sensor 24 at the front of a holder 25 supported by the shaft 20 and adjustable along the same. Sensors 23 and 24 are arranged to strike the movable gripper tongs 10, when it reaches its end positions respectively for the control of the different functions of the machine, i.e. the feeding motions and the cross-cutting in a manner known per se.

Figure 2:
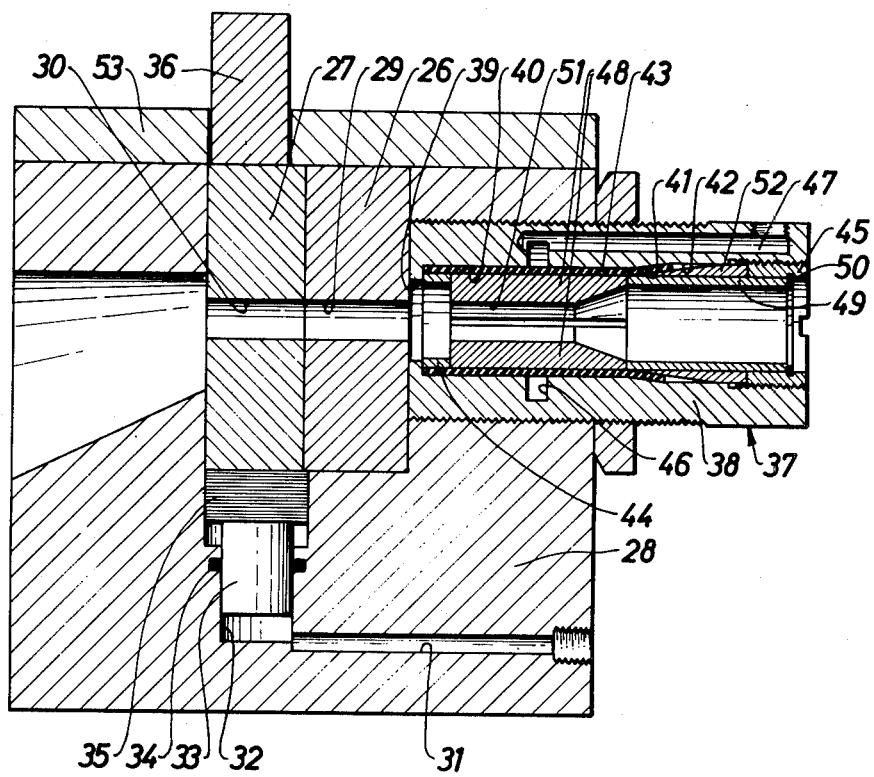
FIG. 2 is a section through the part of the machine in which the cross-cutting takes place.

The cross-cutting tool of the machine consists of two slides 26 and 27 of which slide 26 is rigidly mounted in a block 28 and the other slide 27 rests against slide 26 and is movable along the same. Each of the two slides is provided with a bore 29 and 30 respectively, the diameter of which exceeds the diameter of the rod 7 being cut. The two slides 26 and 27 are positioned in a recess, open towards the top side of the block 28 and are kept in place by a cover 53 covering said recess. During operation a canal 31 in block 28 is connected to a compressed air pipe (not shown), which displaces a piston 33 arranged in a bore 32, in communication with canal 31, towards the upper displacing position shown in FIG. 2. In this position, slide 27 is kept in a stop position against cover 53, and the bores 29 and 30 of the two slides are in alignment. Piston 33 is surrounded by the sealing ring 34, recessed in the walls 32 of the bore. Between one end of the piston 33 and slide 27 there is arranged a damping body 35, consisting of an elastic material, intended to dampen the stop of piston 33 against the bottom of bore 32, when slide 27 by striking device 36 during the cutting operation, is brought down against the air spring formed in canal 31.

In front of slides 26, as seen in the feeding direction, a braking device is screwed into block 28 and is, as a whole, designated with numeral 37. The braking device comprises an outwardly threaded casing 38, formed with an internal bore. Part 39, of this bore positioned nearest slide 26, has a comparatively small diameter and is connected to a second part 40 with a somewhat larger diameter, while part 40, in turn, is connected to another bore part 42 with a still larger diameter via a conical intermediate part 41. A casing 43 of an elastic material, preferably rubber, in the form of a hose, is inserted in part 40. Casing 43 is, at its inner end part kept biased against the inner wall of casing 38 with the aid of a biased cylindrical ring 44. The outer end part of elastic casing 43 is kept biased against the conically shaped wall part 41 with the aid of a wedge shaped clamping sleeve 52 which is kept in position by an arbor 45, screwed into casing 38 from its outer end. With said biasing devices the elastic casing 43 is sealed against the inner wall of casing 38 along its entire periphery. Around casing 43 there extends an annular groove 46 which is arranged in casing 38 and communicates with a compressed-air canal 47. Two jaws 48 together form a casing which is longitudinally split and with its front end rests against clamping ring 44 and its back end is kept in position by a casing 49 which, in turn, is locked by a Seger-locking device 50 or the like. The diameter of the bore 51 of the jaws 48 is adapted to be smaller than the diameter of rod 7 when the jaws rest against each other.

The length of the cross-cut rod pieces is determined by the position of the tongs 10. The length can be shortened by movement of spindle 13 to thereby displace the back gable of cylinder 12 to the left in FIG. 1, whereby the stroke of the piston in the cylinder is shortened. Similarly distance of the gripper tongs 10 can be increased by movement of the spindle 13 to the right. The holder 25 is suitably adjusted to such a position that the gripper tongs 10 contact the sensor 24 just before the slide 9 reaches its back end position.

The feeding of the rod 7 occurs during the motion of the slide 9 to the left with the tongs 10 in gripping position and the tongs 4 in release position. When the tongs 10 have reached the front position the tongs 4 grip and the tongs 10 release, whereafter the slide 9 moves back to its right end position, and a new feeding motion may occur. When the gripper tongs 4 are in gripping position and consequently hold the rod, cross-cutting of the rod occurs by the displacement of slide 27, relative to slide 26. When the back end of rod 7 has passed sensor 22 a new rod will be fed in from the supply. At the latest when the end of the rod passes the front displacing position of tongs 10, canal 47 and the space outside the elastic casing 43 will be brought under pressure, causing the jaws 48 to be pressed against the rod and to form a steady guide for the rod. The pressing force is adjusted such that the feeding devices are able to overcome the frictional force which counteracts the feeding force, attained by jaws 48. When the end of the rod has passed the sensor 22 a counter (not shown) is set into function which controls the feeding of the rod so that the last piece of the rod, not of full length, will be fed past the cross-cutting tool and the accompanying rod is fed so far, that pure cutting can take place.

The present invention is not limited to the device described above and shown in the drawing. The device can be modified in various details within the scope of the accompanying claims, without departing from the principle of the invention. The device shown in the drawing is intended for use in cross-cutting rods with circular cross-section but it is, of course, also within the scope of the invention to use the device in connection with rod material of other cross sections. In some cases, accordingly, it will be necessary to adapt the inner surfaces of jaws 48 to the form of the rod being cut. It is very easy to change the jaws 48. They can be pulled out after removing locking ring 50 and casing 49. The elastic casing 43 is during this removal retained by locking ring 44 and casing 52.

I claim:

1. In a machine for cutting a rod-like material transversely to its longitudinal axis: means for feeding said material through said machine, means for cutting a portion off said rod-like material and brake means arranged in the vicinity of said cutting means for guiding and braking the rod-like material in the vicinity of said cutting means, said brake means including a housing with inner walls, means in said housing for frictionally engaging said material as it is being fed by said feeding means to guide said material in the vicinity of said cutting means, said means for frictionally engaging said material comprising at least two radially movable jaws, a flexible hose in said housing and surrounding said jaws, means sealingly holding said flexible hose in position in said housing adjacent to but outwardly of the ends of said jaws including means for pressing the end portions of said hose outwardly against said inner walls of said housing, and means for introducing a fluid under pressure into said housing outwardly of said flexible hose and between said sealing means for radially inwardly moving said jaws towards said material.

* * * * *